(12) United States Patent
Song

(10) Patent No.: US 7,394,480 B2
(45) Date of Patent: Jul. 1, 2008

(54) RECORDING AUDIO AND VIDEO IN A MOBILE COMMUNICATION TERMINAL

(75) Inventor: Young-Joong Song, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 10/998,109

(22) Filed: Nov. 24, 2004

(65) Prior Publication Data
US 2005/0110874 A1  May 26, 2005

(30) Foreign Application Priority Data
Nov. 25, 2003  (KR) ...................... 10-2003-0084156

(51) Int. Cl.
H04N 7/14  (2006.01)
(52) U.S. Cl. ................ 348/14.02; 455/575.3
(58) Field of Classification Search ... 348/14.01–14.16, 348/333.06, 373, 240.99; 455/556.1, 556.2, 455/575.1, 575.3, 575.4, 66.1, 550.1, 566
See application file for complete search history.

(56) References Cited

U.S. PATENT DOCUMENTS

| | | | |
|---|---|---|---|
| 5,579,046 A * | 11/1996 | Mitsuhashi et al. ...... | 348/231.4 |
| 6,466,202 B1 * | 10/2002 | Suso et al. ............... | 455/575.3 |
| 6,567,677 B1 * | 5/2003 | Sokoloff .................. | 455/575.1 |
| 6,731,912 B1 | 5/2004 | Miyashita .................. | 455/90.2 |
| 6,876,379 B1 * | 4/2005 | Fisher ..................... | 348/14.02 |
| 2002/0072395 A1 * | 6/2002 | Miramontes ................ | 455/566 |
| 2002/0176004 A1 * | 11/2002 | Shinada .................. | 348/207.99 |
| 2002/0181722 A1 | 12/2002 | Hibino et al. .................. | 381/92 |

(Continued)

FOREIGN PATENT DOCUMENTS

JP  2001169158 A  *  6/2001

(Continued)

Primary Examiner—Stella Woo
(74) Attorney, Agent, or Firm—Lee, Hong, Degerman, Kang & Schmadeka

(57) ABSTRACT

The present invention relates to a microphone switching apparatus and method for a mobile communication terminal having a camcorder function, and in particular, a mobile communication terminal having a rotational camera so as to record more distinct and clearer sound, by disposing a microphone on the front and rear side of a mobile communication terminal and operating a microphone at a position corresponding to the direction of a subject (an object to be recorded) and a sound source. In a related art mobile communication terminal, a volume of voice/sound from a subject is recorded undesirably low when a subject is located in front direction of a mobile communication terminal and a camera is directed toward the subject, since it is recorded through the microphone located in the rear side of the terminal, wherein the microphone for voice communication is used for recording voice/sound when performing a camcorder function. To solve the aforementioned problems, a microphone switching apparatus and method for a mobile communication terminal has an effect to increase a volume and clearness of voice or sound which is recorded in video, and thereby to greatly improve the quality of video, which additionally disposes a front microphone on a front side of a mobile communication terminal so as to be used when performing a camcorder function, selects automatically or manually either of the front microphone or the rear microphone according to a derection of a camera, which the rear microphone is used for voice communication.

21 Claims, 3 Drawing Sheets

U.S. PATENT DOCUMENTS

| | | | |
|---|---|---|---|
| 2004/0041902 A1* | 3/2004 | Washington | 348/14.01 |
| 2004/0192421 A1* | 9/2004 | Kawahara | 348/14.02 |

FOREIGN PATENT DOCUMENTS

| | | | |
|---|---|---|---|
| JP | 2004166159 A | * | 6/2004 |
| KR | 1020030063726 A | * | 7/2003 |
| KR | 2003-283617 | | 10/2003 |
| WO | WO 02100077 A1 | * | 12/2002 |
| WO | WO 03065692 A1 | * | 8/2003 |

* cited by examiner

[FIG. 1]
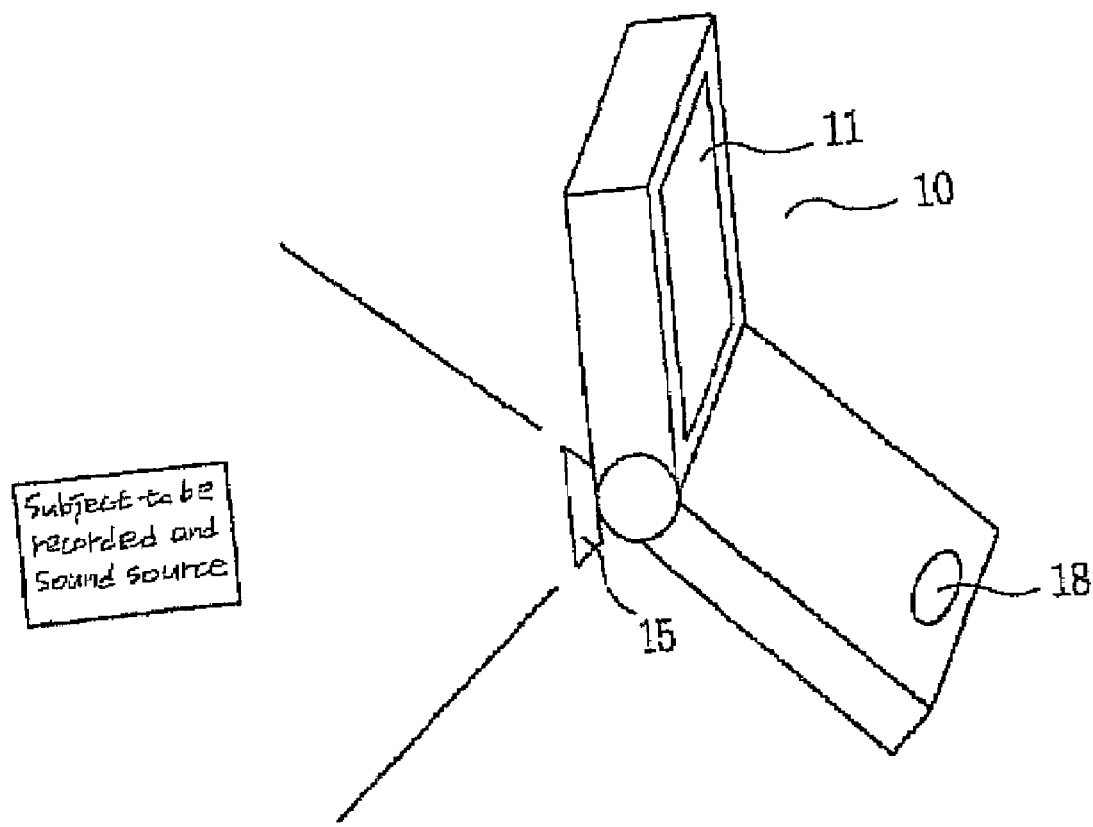

[FIG. 2]
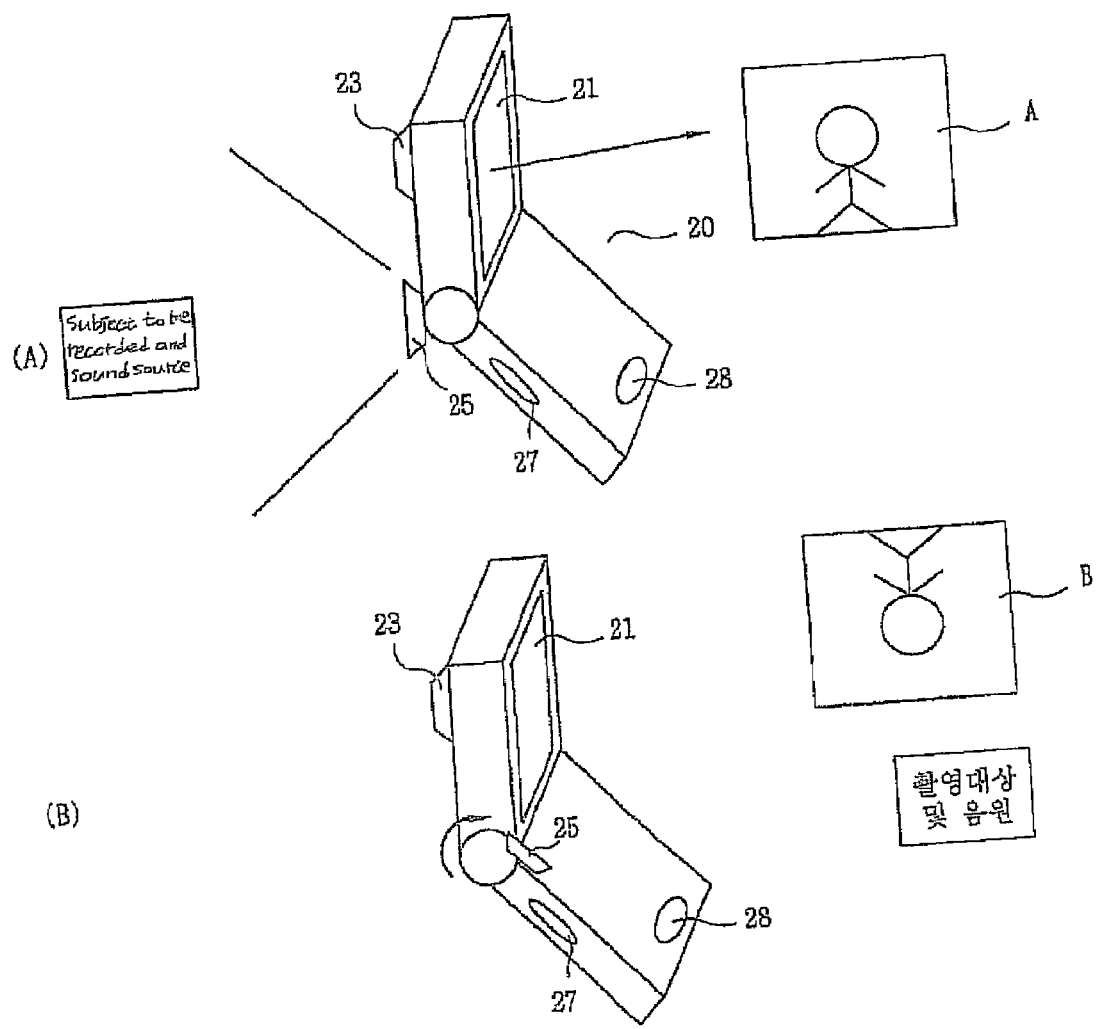

[FIG. 3]
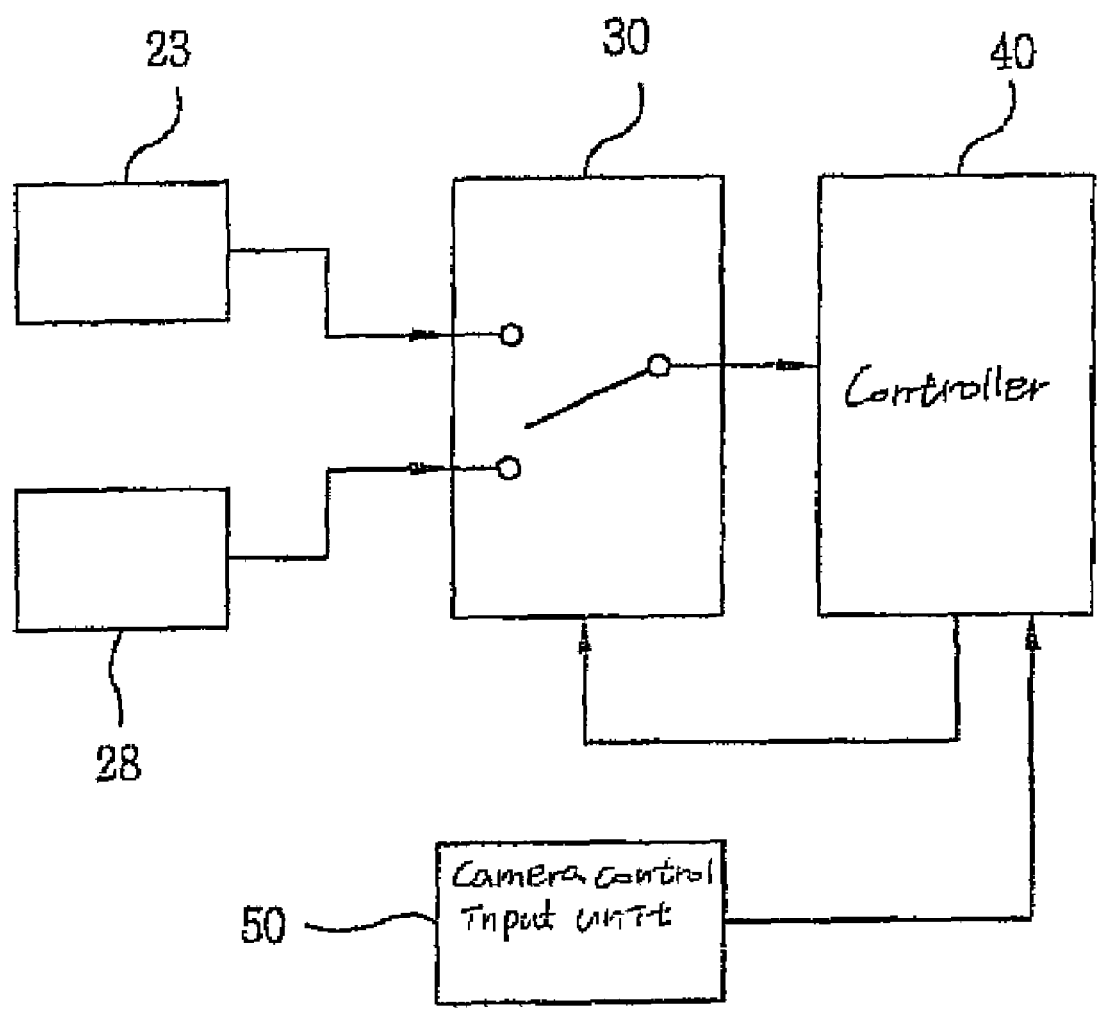

RECORDING AUDIO AND VIDEO IN A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 10-2003-0084156, filed on Nov. 25, 2003, the contents of which are hereby incorporated by reference herein in their entirety.

BACKGROUND OF THE INVENTION

1. Field of the Invention

The present invention relates to a system and method in a mobile communication terminal for recording audio and video. In particular, a mobile terminal having a camera that records video and directs a microphone for recording a corresponding audio from its source is disclosed.

2. Description of the Related Art

A mobile communication system such as a mobile terminal is mounted with a camera, multimedia player, or the like to implement a variety of functions such as a multimedia communication, voice communication, or short message service. A conventional mobile terminal has either an internally mounted camera or an externally mounted camera. The mobile terminal not only takes still images using the camera, but the terminal records video and audio as well.

Referring to FIG. 1, a conventional mobile communication terminal is illustrated including a main body unit 10, keypad 11, a microphone 12, a camera 14, a folder unit 15, a display unit 16, and a speaker 17. The main body unit 10 connects to a keypad 11 for inputting user commands. The microphone 12 is mounted on the main body unit 10. The folder unit 15 is coupled to one end of the main body unit 10 utilizing a hinge unit 13. The folder unit 15 rotates, using the hinge unit 13, about the main body unit 17. The display unit 16 and the speaker 17 mount to the folder unit 15. The folder unit 15 when opened has a keypad 11 facing a rear direction of the mobile terminal.

The camera 14 is mounted or disposed within the hinge unit 13. An image, for example, of a person or an object may be recorded by the camera 14 in a front direction and a rear direction of the mobile terminal. The front direction of the mobile terminal is an opposite direction from that of the rear direction.

The camera 14 rotates about the hinge unit 13 to face an object in a front direction of the mobile terminal. The mobile terminal records and outputs to the display unit 16 an image of the object located in a front direction of the mobile terminal. The image is not inverted.

In another example, a user rotates the camera 14 about the hinge unit 13 directing the camera 14 toward an object positioned to a rear direction of the mobile terminal. The user records the image of the object. The image is outputted to the display unit 16. The image is vertically flipped. The user may flip the image from top to bottom to create a non-inverted image using a key or a keypad on the main body unit.

When an object and an audio input for recording are located in a front direction of the mobile terminal, a volume of the audio input recorded through the microphone 12 located in the rear direction of the mobile terminal is undesirably low. A user may rotate the camera 14 in the direction of the microphone 12, which rotation results in the display unit 16 facing the object. In this position, a user cannot observe the image of the object being recorded because the display unit 16 faces the object.

Other conventional mobile terminals have a display unit that rotates vertically as well as horizontally. However, these conventional mobile terminals have an spatially large hinge connection. This connection undesirably increases the size of the mobile terminal. Additionally users of the conventional mobile terminals having this large hinge connection have difficulty manipulating a keypad for inputting volume selection, lightness control, and color control. This difficulty is caused by the keypad facing away from a user and toward an object, even though the display unit is rotated.

Therefore, there is a need for a system that overcomes the above problems and provides advantages over other systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention provides a mobile communication terminal for recording video and corresponding audio. A microphone of the mobile terminal is positioned to receive audio associated with a video being recorded. A keypad faces a user for easy manipulation by a user from the mobile terminal.

In one embodiment, a system is provided comprising a camera disposed on a mobile terminal for recording video, a first microphone disposed on the mobile terminal for receiving an audio from a first direction of the mobile terminal; and, a second microphone disposed on the mobile terminal for receiving the audio from a second direction of the mobile terminal. The system may be further provided with a body unit having a keypad for inputting a user command, wherein the first microphone mounts to a surface of the body unit. The system may be further provided with a folder unit rotationally connected at one end of the body unit, wherein the second microphone mounts to a surface of the folder unit.

In another embodiment, a method is provided comprising determining whether a video mode of the mobile terminal is set, operating a microphone preset in the mobile terminal first if the video mode is set, and determining whether a signal for changing a camera direction is inputted. The method may further provide operating a different microphone having its direction corresponding to the camera direction if the signal for changing the camera direction.

The method may further provide operating the microphone for voice communication regardless of the camera direction if the video mode is not set. The signal for changing the camera direction is inputted through a pre-determined key set to compensate the image outputted to the display unit in accordance with the camera direction. In one variation, the signal for changing the camera direction is inputted through a position sensor for automatically detecting the camera direction or a position switch. In another variation, the camera direction is selected using a pre-determined menu presented on the terminal display.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

FIG. 1 is a perspective view illustrating a conventional mobile communication phone.

FIG. 2A is a perspective view illustrating when an object and an audio source are positioned in a front direction of the mobile communication terminal.

FIG. 2B is a perspective view illustrating when an object and an audio source are positioned in a rear direction of the mobile communication terminal.

FIG. 3 is a block diagram illustrating a mobile communication terminal in accordance with the present invention.

DETAILED DESCRIPTION OF THE PREFERRED EMBODIMENTS

The present invention relates to a system and method for positioning a microphone while recording video in a mobile communication system. The invention relates to positioning a microphone substantially along the same direction as the source of audio while recording video of objects or persons.

Although the invention is illustrated with respect to a mobile terminal for recording audio corresponding to a video, it is contemplated that the invention may be utilized anywhere it is desired for transmitting, receiving, or processing audio and/or video signals from one location to another location. Reference will now be made in detail to the preferred embodiments of the present invention, examples of which are illustrated in the accompanying drawings.

Referring to FIG. 2A, a mobile terminal includes a body unit such as a main body unit 20 rotationally connected to a folder unit 25. The rotational connection, in this example, is a hinge 23. The main body unit 20 includes a keypad 21 for inputting a user's command and a first microphone 22, for example a body microphone, for inputting a user's voice or output from an audio source.

The folder unit 25 includes a display unit 26, a speaker 27 and a second microphone unit 28, such as a folder microphone. The display unit 26 and the speaker 27, in this example, are mounted to the main body unit 20. The second microphone 28 is disposed or mounted to a surface opposite to that of the display unit 26 and the speaker 27. A side-key 29 attaches to a side of the main body unit 20 for flipping from top to bottom an image outputted to the display unit 26.

The second microphone receives an audio signal from an audio source positioned at a front of the mobile terminal. When recording a video, the first microphone 22 and/or the second microphone 28 are selectively driven corresponding to a direction that the camera 24 faces. A digital switching unit controls the first microphone 22 and/or the second microphone 28 depending on received signals defined by the location of audio sound.

In one example, a subject and an audio source are positioned in a front direction of the mobile terminal. A user rotates the camera 24 about the hinge 23. The camera 24 rotates to face the subject. The camera 24 records and outputs an image (A) to the display unit 26. The display unit 26 outputs the image (A). The image (A) is a non-inverted image substantially identical to that of the subject. A video function of the mobile terminal is set for operating, in this state, the camera 24, and the second microphone 28.

Referring to FIG. 2B, a subject and an audio source are positioned in a rear direction of the mobile terminal corresponding to that which the keypad 21 faces. The camera 24 rotates to face the subject. The camera 24 records and outputs an image (B) to the display unit 26. The display unit 26 outputs an image (B) substantially identical to an inverted image or a flipped image of the subject. The flipped image is changed into the normal image by a user pressing the side-key 29. A video function of the mobile terminal is set for outputting the video of the subject through the camera 24, and operating the first microphone 22.

In other words, a mobile terminal is switched to video mode and a video of a subject is recorded. The microphone positioned in a front direction of the mobile terminal initially receives an audio input. If a mobile terminal is switched to video mode, the second microphone 28 positioned at the front of the mobile communication terminal is operated, and the image outputted to the display unit 26.

Referring to FIG. 3, a block diagram illustrates a camera unit 10, a digital switching unit 40, a control unit 20, and the microphone units 31, 32 of the present invention. The camera unit 10 is provided inputs for directional information of the camera. The control unit 20 outputs control signals for selecting the microphone units 31, 32 according to the directional information of the camera unit 10. The digital switching unit 40 selectively connects to the first microphone unit 31 and the second microphone unit 32 in accordance with a control signal.

The digital switching unit 40 at one end connects to an inner switch which operates a microphone output terminal (Mic_+ and Mic_−) of the control unit 20. The digital switching unit 40 at the other end connects to the first microphone unit 31 and/or the second microphone unit 32. An inner switch is controlled, for example, by a General Purpose Input Output terminal (GPIO_0 and GPIO_1).

Directional information, associated with controlling an image is received from the camera 24 and/or instructions to modify the image are received through the side-key 29 of a mobile terminal. Alternately, a pre-determined menu presented on the display unit 26 is used to control the images received from the camera 24. The image is displayed on the display unit 26. The control unit 20 outputs a control signal for controlling the digital switching unit 40. The control unit 20 uses information from the camera unit 10 and the directional information associated with the camera.

In one example, the control unit 20 detects the direction of the camera 24 being rotated to the rear and the side-key 29 being pressed to change top and bottom of the image outputted to the display unit 26. The control unit 20 outputs a control signal connecting the inner switch of a digital switching unit 40 to the first microphone 31. The digital switching unit 40 operates the first microphone 22.

If the direction of the camera 24 is rotated to record a video in a rear direction of a mobile terminal, and the side-key 29 is manipulated, the second microphone 28 installed at the folder unit 25 is automatically operated according to the basic setting of the video mode.

In another embodiment of the present invention, the method for selecting a microphone for receiving audio from video comprises inputting directional information of a camera 10 to a control unit 20, and outputting a control signal from a control unit 20 for selecting a first microphone unit 31 and/or second microphone unit 32. The control signal includes the directional information provide by the camera unit 10.

The method further comprises connecting selectively a digital switching unit 40 to the first microphone unit 31 or the second microphone unit 32 according to the control signal. In one alternative, the digital switching unit 40 selects both the first microphone unit 31 and second microphone unit 32.

Software mounted at the control unit can include a method that the user can select the operation of the microphones by the hand according to circumstances as well as the method that recording of a voice is optimized by automatically coordinating the direction for recording video by the camera with the direction of the chosen microphone.

This system provides a user pressing the side-key for flipping from top to bottom the displayed image, a first microphone or a second microphone along a direction corresponding to the position of the subject and the audio source. Input commands to a keypad or a camera choose which microphone records audio corresponding to video. This keypad or camera provides the mobile terminal ability to control the microphones positioned near to the audio source receiving the audio.

The mobile terminal provides a solution by mounting at least one microphone on an outer surface of the folder unit for having the microphones selectively operated corresponding to the direction of the camera.

The mobile terminal of the present invention provides a solution for optimizing the volume received for a video through recording an audio using a microphone at a position corresponding to the direction of the camera and/or direction of the audio source.

Although the present invention is described in the context of a mobile terminal, the present invention may also be used in any wired or wireless communication systems using mobile devices, such as PDAs and laptop computers equipped with wired and wireless wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A system for recording an audio corresponding with a video in a mobile communication system, the system comprising:
   a mobile terminal having a body unit with a keypad for inputting a user command and a folder unit rotationally connected at one end of the body unit with a hinge;
   a camera disposed on the hinge for recording video wherein the camera is rotatable to at least one of a first direction and a second direction;
   a first microphone disposed on a surface of the body unit configured to receive audio when the camera is rotated to the first direction;
   a second microphone disposed on a surface of the folder unit configured to receive audio when the camera is rotated to the second direction; and
   a display unit and a pre-determined menu disposed on the mobile terminal, wherein the pre-determined menu inverts the video before outputting on the display unit.

2. The system of claim 1, further comprising a display unit disposed on the terminal configured to display the video.

3. The system of claim 2, further comprising a speaker unit for playing the audio corresponding with the video.

4. The system of claim 2, wherein the second microphone is disposed on an outer surface of the folder unit for receiving the audio that corresponds to the video.

5. The system of claim 1, wherein the first direction of the terminal is opposite to that of the second direction of the terminal.

6. A system for recording an audio corresponding to a video in a mobile communication system, the system comprising:
   a first microphone disposed on a first surface of a body unit for receiving audio from a first direction of a mobile terminal;

a second microphone disposed on a second surface of a folder unit for receiving audio from a second direction of the mobile terminal;

a digital switching unit electrically coupled to the first microphone and the second microphone for selectively connecting the first microphone and the second microphone; and a control unit electrically coupled to the digital switching unit for generating a control signal to control the digital switching unit according to directional information.

7. The system of claim 6, further comprising a display unit mounted to the rear direction of the terminal when the terminal is opened.

8. The system of claim 6, further comprising a keypad mounted to the rear direction of the terminal when the terminal is opened.

9. The system of claim 6, wherein the front direction of the terminal is an exterior surface opposite to the rear direction of the terminal.

10. The system of claim 6, wherein the directional information is inputted from a camera through a position sensor for automatically detecting the directional position of the camera.

11. The system of claim 6, wherein the directional information is inputted through a pre-determined key set to orient an image outputted to a display unit according to a direction of a camera.

12. A system for recording an audio coinciding with a video in a mobile communication system, the system comprising:

a rotatable camera unit for inputting directional information of the camera unit and an object;

a key inputting unit electrically coupled to the camera unit configured to receive a selection as to whether an image of the object is displayed inverted on the display unit;

a first microphone mounted to a rear direction of a mobile terminal;

a second microphone mounted to a front direction of the terminal;

a control unit configured to generate a control signal for selecting one of the first microphone and the second microphone in accordance with the directional information of at least one of the camera unit or the key inputting unit; and a digital switching unit electrically coupled to at least one of the first microphone and the second microphone for receiving the control signal and controlling one of the first microphone and the second microphone.

13. The system of claim 12, wherein the key inputting unit has a pre-determined key input for selecting whether the image is displayed inverted.

14. The system of claim 12, wherein the control signal controls the digital switching unit such that selection of one of the first microphone and the second microphone corresponds to an operational direction of the camera.

15. An method for recording a video in a front direction or a rear direction of a mobile terminal, the method comprising:

rotating a camera to one of a first direction and a second direction to record a video;

controlling the operation of a first and a second microphone mounted on a front or a rear surface of the terminal respectively;

receiving microphone directional information from a pre-determined key inputting unit;

selecting one of the first and the second microphone for recording an audio associated with the video being recorded according to the microphone directional information; and converting an image of the recorded video on a display according to the microphone directional information.

16. The method of claim 15, further comprising:

operating one of the first and the second microphone having a position preset in the terminal if a video mode is set; and operating one of the first and the second microphone having its direction corresponding to the camera direction if an inputted signal changes a direction of a camera.

17. The method of claim 15, further comprising inputting a change in a change in direction of the camera through a pre-determined key set to compensate an image outputted to the display unit according to the camera direction.

18. The method of claim 15, wherein the signal for changing the camera direction is inputted through a position sensor for automatically detecting the camera direction or a position switch.

19. A method for recording an audio and video signal for a mobile terminal, the method comprising:

determining whether a video mode of the terminal is set;

selecting a first microphone in the terminal if the video mode is set;

determining whether a signal for changing a camera direction is received; and selecting a second microphone having its direction corresponding to the camera direction if the signal for changing the camera direction is received from a predetermined key set to compensate an image provided to a display unit according to the camera direction.

20. The method of claim 19, further comprising selecting the second microphone for voice communication regardless of the camera direction if the video mode is not set.

21. The method of claim 19, wherein the signal for changing the camera direction is received from a position sensor or a position switch for automatically detecting the camera direction.

* * * * *